(12) United States Patent
Schwaiger

(10) Patent No.: US 10,822,079 B2
(45) Date of Patent: Nov. 3, 2020

(54) AIRCRAFT

(71) Applicant: CYCLOTECH GMBH, Linz (AT)

(72) Inventor: Meinhard Schwaiger, Linz (AT)

(73) Assignee: CYCLOTECH GMBH (AT)

( * ) Notice: Subject to any disclaimer, the term of this patent is extended or adjusted under 35 U.S.C. 154(b) by 301 days.

(21) Appl. No.: 16/067,780

(22) PCT Filed: Dec. 30, 2016

(86) PCT No.: PCT/AT2016/060137
§ 371 (c)(1),
(2) Date: Jul. 2, 2018

(87) PCT Pub. No.: WO2017/112973
PCT Pub. Date: Jul. 6, 2017

(65) Prior Publication Data
US 2019/0023393 A1     Jan. 24, 2019

(30) Foreign Application Priority Data
Dec. 30, 2015 (AT) .............................. A 51113/2015

(51) Int. Cl.
*B64C 11/00* (2006.01)
*B64C 27/22* (2006.01)
(Continued)

(52) U.S. Cl.
CPC .......... *B64C 39/005* (2013.01); *B64C 11/006* (2013.01); *B64C 27/22* (2013.01); *B64C 2027/8236* (2013.01)

(58) Field of Classification Search
CPC ..... B64C 39/005; B64C 11/006; B64C 27/22; B64C 27/26
See application file for complete search history.

(56) References Cited

U.S. PATENT DOCUMENTS 2,413,460 A * 12/1946 Main .................... B64C 39/005
244/9
3,105,659 A    10/1963  Stutz
(Continued)

FOREIGN PATENT DOCUMENTS

CA     700587 A    12/1964
CA    8253030 A    10/1969
(Continued)

OTHER PUBLICATIONS

PCT/AT2016/060137 International Search Report dated Apr. 11, 2017; 3 pgs.

*Primary Examiner* — Brian M O'Hara
(74) *Attorney, Agent, or Firm* — Bracewell LLP; Douglas F. Stewart; Patrick J. Connolly

(57) ABSTRACT

The invention relates to an aircraft designed as a compound helicopter with an aircraft fuselage, a main rotor arranged on the aircraft fuselage, and cyclogyro rotors which protrude laterally from the aircraft fuselage and which comprise an outer end surface. An improved torque compensation is achieved in that the cyclogyro rotors are connected to the aircraft fuselage by means of a suspension device which holds the cyclogyro rotors at the outer border of the rotors, and each cyclogyro rotor can be controlled individually and independently of the other. A torque compensation function of the main rotor can be carried out by the cyclogyro rotors.

13 Claims, 5 Drawing Sheets

(51) Int. Cl.
*B64C 39/00* (2006.01)
*B64C 27/82* (2006.01)

(56) References Cited

U.S. PATENT DOCUMENTS

| | | | |
|---|---|---|---|
| 3,241,791 A | 3/1966 | Piasecki | |
| 3,448,946 A | 6/1969 | Nagatsu | |
| 3,563,496 A | 2/1971 | Zuck | |
| 3,977,812 A | 8/1976 | Hudgins | |
| 4,691,877 A | 9/1987 | Denning | |
| 4,928,907 A | 5/1990 | Zuck | |
| 5,067,668 A | 11/1991 | Zuck | |
| 5,100,080 A | 3/1992 | Servanty | |
| 5,174,523 A | 12/1992 | Balmford | |
| 5,265,827 A | 11/1993 | Gerhardt | |
| 5,738,301 A | 4/1998 | Francois et al. | |
| 9,409,643 B2 * | 8/2016 | Mores | B64C 27/06 |
| 10,279,900 B2 * | 5/2019 | Robertson | B64C 27/06 |
| 10,384,776 B2 * | 8/2019 | Choi | B64C 39/005 |
| 2005/0082422 A1 | 4/2005 | Tierney | |
| 2006/0157614 A1 | 7/2006 | Simpson | |
| 2006/0169834 A1 | 8/2006 | Arata | |
| 2007/0200029 A1 | 8/2007 | Sullivan | |
| 2013/0327879 A1 | 12/2013 | Scott et al. | |

FOREIGN PATENT DOCUMENTS

| | | |
|---|---|---|
| DE | 102004007682 A1 | 6/2005 |
| DE | 102012002256 A1 | 8/2013 |
| EP | 0690012 A1 | 1/1996 |
| EP | 2105378 A1 | 9/2009 |
| EP | 2146895 A2 | 1/2010 |
| EP | 2511177 A1 | 10/2012 |
| EP | 2666718 A1 | 11/2013 |
| EP | 2690010 A1 | 1/2014 |
| EP | 2690011 A1 | 1/2014 |
| FR | 2776615 A3 | 10/1991 |
| GB | 480750 A | 2/1938 |
| RU | 2089456 C1 | 8/1996 |
| RU | 2500578 C1 | 12/2013 |
| WO | 20050052520 A2 | 1/2005 |

* cited by examiner

AIRCRAFT

CROSS REFERENCE TO RELATED APPLICATIONS

This application is a national stage entry of PCT AT/2016/060137 under 35 U.S.C. § 371, filed Jul. 6, 2017, which claims priority to Austrian application A 51113/2015, which was filed on Dec. 20, 2015, the entire content of which are incorporated herein by reference in their entirety.

BACKGROUND OF THE INVENTION

Field of the Invention

The invention relates to an aircraft designed as a compound helicopter with an aircraft fuselage, a main rotor arranged on the aircraft fuselage, and cyclogyro rotors which protrude laterally from the aircraft fuselage and comprise an outer end surface.

Background Information

Cyclogyro rotors is, in general, the denotation for cylindrical bodies which are mounted in such a manner that they are rotatable about their axis and at the circumference of which there are arranged pivotable rotor blades which are cyclically adjusted by means of an offset adjusting device during operation. Thus a thrust can be generated in any direction perpendicular to the axis in dependence on the adjustment of the rotor blades.

Prior art is represented by compound (hybrid) helicopters which consist of an aircraft fuselage, a single main rotor or a counter-rotating tandem motor, one or several propeller units for the torque compensation and for the thrust generation in forward flight, as well as of additional wing or airfoil units for the generation of a vertical lift in forward flight. Furthermore, there are known helicopter configurations which comprise one or two cyclogyro rotors.

In the lateral arrangement of two rotors below the main rotor on the left-hand side and the right-hand side of the helicopter fuselage, respectively—as is known from prior art—the cyclogyro rotors are connected to the helicopter fuselage exclusively via the rotor shaft. As a result thereof, high forces and torques or moments will occur at the mounting on the aircraft fuselage and in the rotor shaft. Moreover, the cyclic adjustment of the rotor blades by means of a unilateral offset adjustment device is problematic, as enormous centrifugal forces will be generated due to the required high rotor speeds, and as additional torsional moments will burden the rotor blade disproportionally due to the unilaterally initiated cyclic rotor blade articulation.

In the following, further known solutions in connection with the torque compensation in helicopters will be discussed.

From EP 2 690 011 A (Axel Fink) there is known an aircraft configuration which is designed with an aircraft fuselage at which a main rotor is provided approximately in the mass center of gravity, and with two wings at each of which a thrust propeller is arranged backwardly and rigidly in the flight direction. The wings or airfoils are rigidly connected to the aircraft fuselage by means of struts. Instead of a tail rotor there is provided a horizontal and vertical stabilizer. During take-off and landing as well as in the hovering state the vertical lift is generated exclusively by the main rotor, while the two additional propellers generate the torque compensation and the thrust in forward flight. A similar aircraft configuration is known from U.S. Pat. No. 3,385,537 A.

From EP 2 690 010 A (Axel Fink) there is known an aircraft configuration which is designed with an aircraft fuselage at which a main rotor is provided approximately in the mass center of gravity, and with two wings which are connected towards the rear to the horizontal and vertical stabilizer by means of a double fuselage, wherein at the rear ends of the double fuselages a thrust propeller is rigidly arranged, respectively. The wings are rigidly connected to the aircraft fuselage. During take-off and landing as well as in the hovering state the vertical lift is generated exclusively by the main rotor, while the two additional propellers generate the torque compensation and the thrust in forward flight.

From EP 2 690 012 A (Axel Fink) there is known an aircraft configuration which is designed with an aircraft fuselage at which a main rotor is provided approximately in the mass center of gravity, and with four wings, wherein at both front ends of each of the wings there is arranged a pivotally designed ducted fan, respectively. The wings are rigidly connected to the aircraft fuselage. During take-off and landing as well as in the hovering state the vertical lift is generated by the main rotor and is supported by the two ducted fans which also generate the torque compensation and the thrust in forward flight. The rear wings are provided with elevators and rudders, the front wings are provided with ailerons.

From EP 2 666 718 A (Paul Eglin) there is known an aircraft configuration which is designed with an aircraft fuselage at which a main rotor is provided approximately in the mass center of gravity, and with two wings and a horizontal stabilizer, wherein at the front ends of the wings propellers are rigidly arranged in the flight direction. The wings are rigidly connected to the aircraft fuselage. During take-off and landing as well as in the hovering state the vertical lift is generated exclusively by the main rotor, while the two additional propellers generate the torque compensation and the thrust in forward flight.

From EP 2 146 895 A (Philippe Roesch) there is known an aircraft configuration which is designed with an aircraft fuselage at which a main rotor is provided approximately in the mass center of gravity, and with two wings and a horizontal and vertical stabilizer, wherein at the front ends of the wings propellers are arranged rigidly in the flight direction. The wings are rigidly connected with the aircraft fuselage. During take-off and landing as well as in the hovering state the vertical lift is generated exclusively by the main rotor, while the two additional propellers generate the torque compensation and the thrust in forward flight.

From EP 2 105 378 A (Jean-Jaques Ferrier) there is known an aircraft configuration which is designed with an aircraft fuselage at which a main rotor is provided approximately in the mass center of gravity, and with four wings wherein backwards at the larger rear wings there is rigidly arranged a thrust propeller in the flight direction, respectively. The wings are rigidly connected to the aircraft fuselage. During take-off and landing as well as in the hovering state the vertical lift is generated exclusively by the main rotor, while the two additional propellers generate the torque compensation and the thrust in forward flight. The wings are additionally provided with elevators.

From DE 10 2012 002 256 A (Felix Fechner) there is known an aircraft which is designed as a helicopter with additional wings, wherein said wings are implemented to be pivotable or are implemented in segments and thereby produce a reduction of the obstruction of the rotor downwind and facilitate a higher flying velocity during hover flight or low speed flight. During take-off and landing as well as in the hovering state the vertical lift is generated exclusively by the main rotor.

From RU 2 500 578 A (Nikolaevich Pavlov Sergej) there is known an aircraft configuration which is designed with a an aircraft fuselage at which a main rotor is provided approximately in the mass center of gravity, with two propeller units which are arranged in the front region laterally in relation to the aircraft fuselage and in parallel to the flight direction for the forward thrust and with two pivotable wings as horizontal stabilizer, and a vertical stabilizer in the rear region. During take-off and landing as well as in the hovering state the vertical lift is generated exclusively by the main rotor, while the two additional propellers generate the torque compensation and the thrust in forward flight.

From US 2013 0327879 A (Mark W. Scott) there is known an aircraft configuration which is designed as a helicopter with a main rotor and a tail rotor, which can be pivoted about an axis of rotation, approximately in parallel to the axis of rotation of the main rotor. The pivotable tail rotor stabilizes the aircraft in the hovering state and it can additionally generate a horizontal thrust in the flight direction, while during take-off and landing as well as in the hovering state the vertical lift is generated exclusively by the main rotor.

From US 2006 0169834 A (Allen A. Arata) there is known an aircraft configuration which is designed as a helicopter with a main rotor and with a tail rotor, and with two additional wings. The wings are rigidly arranged at the aircraft fuselage below the main rotor and can be pivoted approximately in the middle of their length by 90° downwards in parallel to the aircraft axis, and in this position they serve as landing skid or landing gear. During take-off and landing as well as in the hovering state the vertical lift is generated exclusively by the main rotor, while in the forward flight an additional lift is generated by the two extended wings.

From WO 2005/005250 A (Arthus W. Loper) there is known an aircraft configuration which is designed as a helicopter with a main rotor, a tail rotor, a propeller at the front end of the helicopter, with two additional wings and with a horizontal and vertical stabilizer. The wings are rigidly arranged at the aircraft fuselage below the main rotor. During take-off and landing as well as in the hovering state the vertical lift is generated exclusively by the main rotor, while in the forward flight an additional lift is generated by the two wings. The front-end propeller generates the thrust for the forward flight.

From US 2006 0157614 A (John S. Pratt) there is known an aircraft which is designed as a helicopter with several additional wings below the main rotor, wherein said wings are implemented in segments and in a pivotable manner, and thereby they enable a reduction of the obstruction of the rotor downwind and facilitate a higher flying velocity during hover flight or low speed flight. During take-off and landing as well as in the hovering state the vertical lift is generated exclusively by the main rotor, and in the faster forward flight the additional wings support the vertical lift. The torque compensation is carried out by means of the individual setting of the segmented wings via the downwind of the main rotor, and no tail rotor is present.

From FR 9 803 946 A (Paul Julien Alphonse) there is known an aircraft configuration which is designed as a helicopter with a main rotor, a tail rotor, a propeller at the backside of the helicopter, with two additional wings and with a horizontal and vertical stabilizer. The wings are rigidly arranged at the aircraft fuselage outside the main rotor. During take-off and landing as well as in the hovering state the vertical lift is generated exclusively by the main rotor, while in the forward flight an additional lift is generated by the two wings. The backside propeller generates the thrust for the forward flight.

From U.S. Pat. No. 5,738,301 A (Daniel Claude Francois) there is known an aircraft configuration which is designed as a helicopter with a main rotor, a tail rotor, a propeller at the backside of the helicopter, with two additional wings, and with a horizontal and vertical stabilizer. The wings are rigidly arranged at the aircraft fuselage below the main rotor. During take-off and landing as well as in the hovering state the vertical lift is generated exclusively by the main rotor, while in the forward flight an additional lift is generated by the two wings. The backside propeller generates the thrust for the forward flight.

From U.S. Pat. No. 5,174,523 A (David E. H. Balmford) there is known an aircraft configuration which is designed as a helicopter with a main rotor, a propeller with a flow guiding unit at the backside of the helicopter, and with two additional wings. The wings are rigidly arranged at the aircraft fuselage below the main rotor. During take-off and landing as well as in the hovering state the vertical lift is generated exclusively by the main rotor, while in the forward flight an additional lift is generated by the two wings. The backside propeller generates the thrust for the forward flight and the torque compensation by means of the flow guiding unit.

From RU 2 089 456 A (Mikhail Il'ich Fefer) there is known an aircraft configuration which is designed as a helicopter with two wings which are arranged in the central region of the fuselage, wherein at the ends of said two wings there is rigidly arranged a main rotor, respectively. The wings are rigidly arranged at the aircraft fuselage below the respective main rotor. During take-off and landing as well as in the hovering state the vertical lift is generated exclusively by the main rotor, while in the forward flight an additional lift is generated by the two additional wings.

From U.S. Pat. No. 5,067,668 A (Daniel R. Zuck) there is known an aircraft designed as a helicopter with additional wings below the main rotor, wherein said wings are designed in a pivotable manner and thereby enable the torque compensation during the hover flight or low speed flight, and hence the tail rotor as a torque compensation is omitted. The propeller arranged at the tail is used exclusively for the generation of a thrust for the forward flight. During take-off and landing as well as in the hovering state the vertical lift is generated exclusively by the main rotor.

From U.S. Pat. No. 4,928,907 (Daniel R. Zuck) there is known an aircraft designed as a helicopter with additional wings below the main rotor, wherein said wings are designed in a pivotable manner and thereby enable the torque compensation during the hover flight or low speed flight, and hence the tail rotor as a torque compensation is omitted. A propeller arranged at the tail is used exclusively for the generation of a thrust for the forward flight. During take-off and landing as well as in the hovering state the vertical lift is generated exclusively by the main rotor.

From U.S. Pat. No. 4,691,877 A (Ralph M. Denning) or GB 2143483 (John Denman Sibley) there is known an aircraft which is designed as a helicopter with additional wings below the main rotor, and pivotable flaps are arranged at the wings, around which the exhaust gas of the afterburner from the main drive flows. The wings are rigidly connected to the aircraft fuselage. During take-off and landing as well as in the hovering state the vertical lift is generated by the main rotor and by the exhaust gas flow from the two afterburners which can also generate a torque compensation and an additional thrust in forward flight.

From U.S. Pat. No. 3,977,812 A (Wayne A. Hudgins) there is known an aircraft configuration which is designed as a helicopter with a main rotor, a tail rotor, a propeller at the backside of the helicopter, and with two additional wings. The wings are rigidly arranged at the aircraft fuselage below the main rotor. During take-off and landing as well as in the hovering state the vertical lift is generated exclusively by the main rotor, while in the forward flight an additional lift is generated by the two wings. The backside propeller generates the thrust for the forward flight.

From CA 825 030 A (Nagatsu Teisuke) or U.S. Pat. No. 3,448,946 A (Nagatsu Teisuke) there is known an aircraft configuration which is designed as a helicopter with a main rotor, a tail rotor, a propeller at the backside of the helicopter, with a horizontal and vertical stabilizer, and optionally with two additional wings. The wings are rigidly arranged at the aircraft fuselage below the main rotor. During take-off and landing as well as in the hovering state the vertical lift is generated exclusively by the main rotor, while in the forward flight an additional lift is generated by the two wings. The backside propeller generates the thrust for the forward flight.

From the publication by C. Silva and H. Yeo, Aeroflightdynamics Directorate, U.S. Army RDECOM, and W. Johnson, NASA Ames Research Center: "Design of a Slowed-Rotor Compound Helicopter for Future Joint Service Missions", Aeromech Conference, San Francisco, Calif., January 2010, there is known an aircraft configuration which is designed as a helicopter with a main rotor, a tail rotor, a propeller at the backside of the helicopter, with a horizontal and vertical stabilizer, and with two additional wings. The wings are rigidly arranged at the aircraft fuselage below the main rotor. During take-off and landing as well as in the hovering state the vertical lift is generated exclusively by the main rotor, while in the forward flight an additional lift is generated by the two wings. The backside propeller generates the thrust for the forward flight.

From U.S. Pat. No. 3,563,469 A (Daniel R. Zuck) there is known an aircraft configuration which is designed as a helicopter with a main rotor, a tail rotor, a propeller at the backside of the helicopter, with a horizontal and vertical stabilizer, and with two additional pivotable wings. The wings are arranged in a pivotable manner at the aircraft fuselage below the main rotor. During take-off and landing as well as in the hovering state the vertical lift is generated exclusively by the main rotor, while in the forward flight an additional lift is generated by the two wings. The backside propeller generates the thrust for the forward flight, the tail rotor generates the torque compensation.

From U.S. Pat. No. 3,241,791 A (F. N. Piasecki) there is known an aircraft configuration which is designed as a helicopter with a main rotor, a ducted fan at the backside of the helicopter, with two additional wings arranged at the aircraft fuselage below the main rotor, and with a flow guiding unit at the output of the ducted fan. During take-off and landing as well as in the hovering state the vertical lift is generated exclusively by the main rotor, while in the forward flight an additional lift is generated by the two wings. The backside ducted fan with the flow guiding unit generates the thrust for the forward flight and the torque compensation.

From CA 700 587 A and U.S. Pat. No. 3,105,659 A (Richard G. Stutz) there is known a helicopter aircraft configuration which is designed as a helicopter with a main rotor, a tail rotor, a horizontal stabilizer, and with two additional rigid wings with aileron flaps and propellers. The wings are arranged at the aircraft fuselage below the main rotor. During take-off and landing as well as in the hovering state the vertical lift is generated exclusively by the main rotor, while in the forward flight an additional lift is generated by the two wings. The tail rotor generates the torque compensation, and the two propellers generate the thrust in forward flight.

All said known compound helicopter aircraft configurations which are designed with classical thrust generating means like propellers have the disadvantage that the vertical lift for the take-off and the landing as well as in the hovering state is exclusively or mainly generated by the main rotor, and that a correspondingly large main rotor diameter is required. In the forward flight the large main rotor produces the largest flow resistance and causes the largest energy loss. The additional drive units like propellers or ducted fans facilitate higher flying velocities and improved maneuverabilities, but with an increasing flying velocity the efficiency is reduced and the energy consumption is increased disproportionally.

The known compound helicopter aircraft configurations with cyclogyro rotors have the disadvantage that in the known lateral arrangement of the cyclogyro rotors the rotor discs and support elements influencing the aerodynamics are lacking and that the cyclic adjustment of the rotor blades has to be carried out by a rotating rotor shaft and can only be carried out from the side facing the aircraft fuselage, respectively, that with the known horizontal arrangement as a tail rotor no contribution to the generation of the thrust force in the flight direction can be made, and that the through-flow cross-section in the rotor is reduced massively by the helicopter structure, and that with the vertical arrangement as tail rotor no contribution to the vertical thrust generation can be made.

From U.S. Pat. Nos. 5,100,080 A, 5,265,827 A, and US 2007/0200029 A1 there are known aircrafts with cyclogyro rotors having adjustable rotor blades. Combinations with main rotors are not mentioned therein. Therefore, the advantages of a helicopter cannot be utilized.

SUMMARY OF THE INVENTION

The object of the present invention is to define a novel aircraft on the basis of a helicopter which avoids the above-described disadvantages without losing the additional benefits.

This object is achieved according to the invention in that the cyclogyro rotors are connected to the aircraft fuselage by means of a suspension device which holds the cyclogyro rotors at the outer border of the rotors, and that each cyclogyro rotor can be controlled individually and independently of the other, and that a torque compensation function of the main rotor can be carried out by the cyclogyro rotors.

In this case it is a helicopter which is equipped with two additional laterally arranged cyclogyro rotors which—independently of one another—can generate a thrust vector to be controllable in any direction in a plane substantially in parallel to the axis of rotation of the main rotor and to the longitudinal axis of the helicopter, and hence they can take over the torque compensation of the main rotor in all flying situations, they will supplement the vertical thrust of the main rotor in the vertical take-off, landing, and hovering state, they will support the secure transition from the hovering state into the forward flight, and they will generate the required thrust in forward flight. Due to the support of the vertical thrust of the main rotor, the main rotor can be made with a diameter smaller in size compared to the classical helicopter and all known compound (hybrid) helicopters so that in forward flight a better efficiency can be obtained or that with a comparable driving power a higher velocity can be achieved. A tail rotor in the classical sense is not necessary.

In this connection, two cyclogyro rotors are connected to the aircraft fuselage laterally by means of a support device or with supporting elements such that the thrust forces generated by the cyclogyro rotor can be introduced into the aircraft fuselage so that a substantially lighter construction can be achieved. Furthermore, by the cyclogyro rotors which can be controlled independently of the other the torque compensation is taken over so that no tail rotor is necessary which facilitates a further reduction in weight.

The connection of the suspension device to the aircraft fuselage can also be effected indirectly by means of other components.

The bilateral mounting of the cyclogyro rotors in the suspension device is of special importance, as it does not only facilitate a lighter and more robust construction, but also an adjustment of the rotor blades on both sides.

In a particular embodiment of the invention the offset adjustment devices required for the cyclic adjustment of the rotor blades are arranged on both sides of the cyclogyro rotor, whereby a light and robust construction is obtained which puts the least load on the critical rotor components. The introduction of the torque into the cyclogyro rotors takes place at the side of the cyclogyro rotor facing the aircraft fuselage.

By the preferred arrangement of the cyclogyro rotors below the main rotor, the main rotor can be reduced in size to a substantial degree, as the generation of the vertical thrust for the vertical take-off, landing, and for the hovering state is supported by two cyclogyro rotors arranged laterally at the aircraft fuselage below the main rotor. A cyclogyro rotor generates a thrust vector that can be controlled in a plane perpendicular to the axis of rotation of the rotor in any direction and can be adjusted continuously from 0 up to a maximum value by changing a cyclic pitch angle of the rotating rotor blades as a function of the displacement of an offset position within the rotating cyclogyro rotor. By the lateral arrangement of such rotors at one side of the aircraft fuselage, respectively, and by the unlimited change of direction of the thrust vectors, said rotors furthermore generate the torque compensation of the main rotor so that in this configuration no tail rotor is required. The configuration according to the invention facilitates a vertical take-off helicopter which shows a lower energy consumption at the same carrying capacity, which has a smaller main rotor diameter and thus can take off and land also on a smaller space, which does not require any tail rotors, and which achieves a higher flying velocity with a comparatively lower energy consumption. The compound helicopter according to the invention also has the potential of a larger range with the same fuel load. A further advantage is the higher agility in almost all flight phases.

It is preferred if the suspension device is designed as wings or airfoils in order to generate a lift in the forward flight. Thereby, on the one hand, the load on the main rotor can be reduced and, on the other hand, the maximum velocity can be increased, as the main rotor can be operated with a reduced speed.

In this connection it is particularly favorable if the suspension device is arranged above the cyclogyro rotors. In this way, in the forward flight an improved flow against the cyclogyro rotors can be achieved. In order to improve the effect of the main rotor onto the cyclogyro rotors it can in particular be provided that the suspension device has a recess directly above the cyclogyro rotors.

Preferably there is provided a horizontal and vertical stabilizer for the stabilization. This means in particular that no separate airscrew is provided in order to manage the torque compensation, which is also not required due to the design according to the invention.

A particular embodiment of the invention provides that the cyclogyro rotors are connected to the drive of the main rotor by means of a gear. This means that the speeds of the main rotor and of the cyclogyro rotors always will be in a constant proportion to each other. The respectively required thrust will be adjusted by the adjustment of the rotor blades. This enables a very simple drive.

Alternatively it can be provided that the cyclogyro rotors have a drive which is independent of the main rotor, wherein said drive can be electrical, hydraulic, or can be implemented as an individual drive unit. Thereby the thrust can be varied within particularly broad limits.

In a particularly advantageous embodiment the aircraft does not have any tail rotor. Thereby the weight can be reduced and the constructional expenditure is reduced.

BRIEF DESCRIPTION OF THE FIGURES

The invention will now be described in detail by means of FIGS. 1 to 8, wherein.

DETAILED DESCRIPTION OF THE INVENTION

Figure 1:
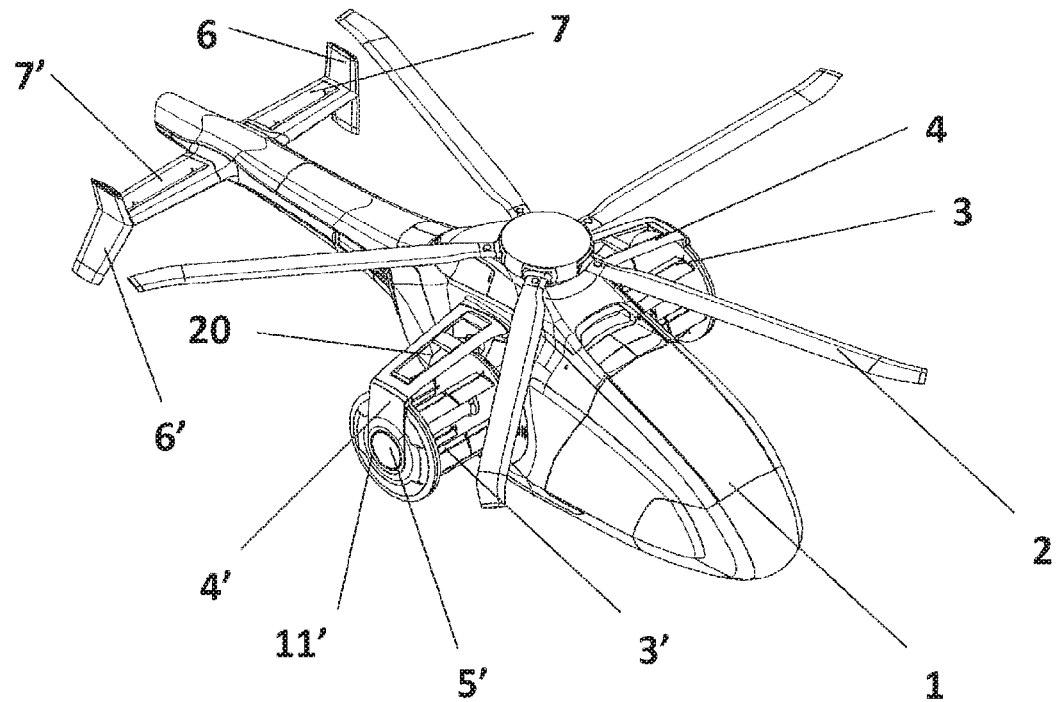
FIG. 1 shows a compound helicopter according to the invention in a diagonal view from above.

FIG. 1 shows an aircraft according to the invention, namely a compound helicopter, in a diagonal view from above, consisting of the aircraft fuselage 1, the main rotor 2, the laterally arranged cyclogyro rotors 3 and 3', the suspension 4 and 4' of the cyclogyro rotors, the outer mounting or bearing 5', and the outer offset adjustment device 11', and the horizontal and vertical stabilizer 6, 6', 7, 7', and the recess 20 in the suspension 4 and 4'.

Figure 2:
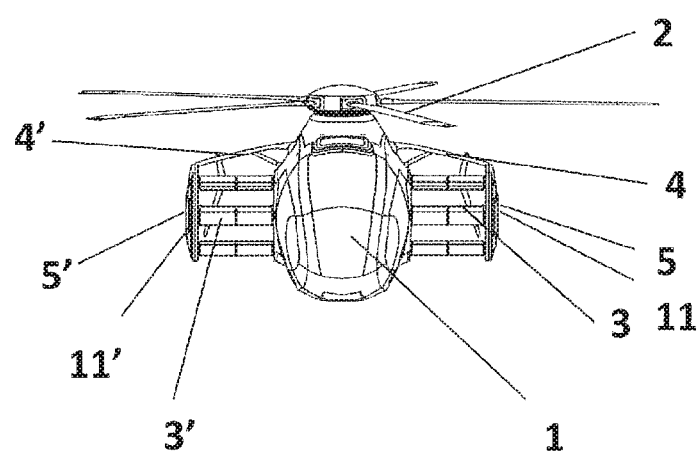
FIG. 2 shows the helicopter of FIG. 1 in a view from the front.

FIG. 2 shows the compound helicopter according to the invention in a front view, with the two laterally arranged cyclogyro rotors 3 and 3', their suspension 4 and 4', wherein the suspension 4 and 4' is also designed as a wing or airfoil or as a component having the function of a wing or airfoil. In the central region there is provided a recess 20 which facilitates a passage of air downwards. The suspension 4, 4' is fixed on the one hand at the aircraft fuselage 1 and on the other hand at the outside of the cyclogyro rotors 3, 3' and holds them.

An offset adjustment device 11 and 11' for the adjustment of the rotor blades 9 is arranged at the outside of the cyclogyro rotors 3, 3', wherein the two offset adjustment devices facing the aircraft fuselage 1 of the helicopter are not visible. Thereby it is possible to perform the cyclic adjustment of the rotor blades 9 from two sides and to provide the drive of the rotor 3, 3' from the side facing the aircraft fuselage 1 of the helicopter. It is provided that the cyclogyro rotors 3, 3' have a length in the axial direction (e.g., a distance from the aircraft fuselage 1 to the outer border) which corresponds approximately to the diameter of the cyclogyro rotors 3, 3' and preferably lies between 80% and 120% of the diameter.

Figure 3:
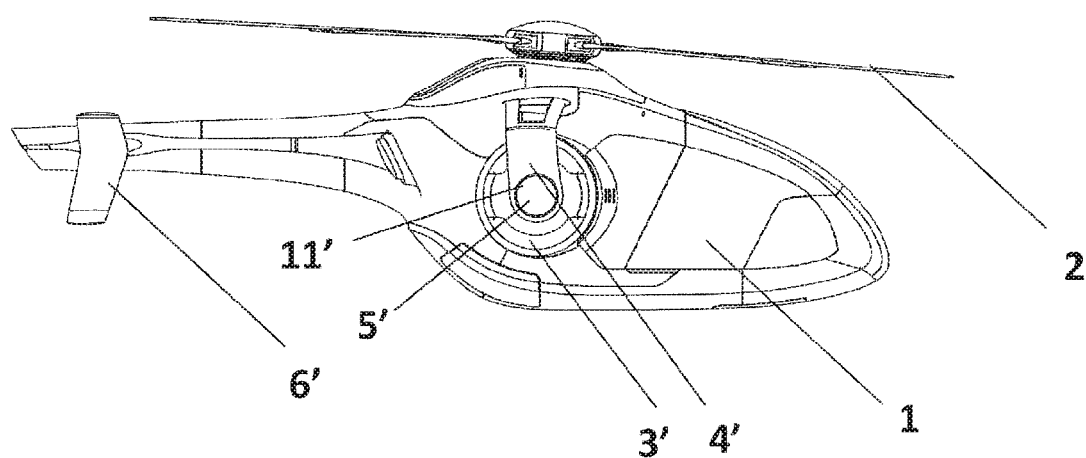
FIG. 3 shows the helicopter of FIG. 1 in a lateral view.

FIG. 3 shows the compound helicopter according to the invention in a lateral view, with the laterally arranged cyclogyro rotor 3', its suspension 4', wherein the suspension can also be implemented as a wing or as a component having the function of a wing, the outer rotor mounting or bearing 5', and the outer offset adjustment device 11', and the vertical stabilizer 6.

Figure 4:
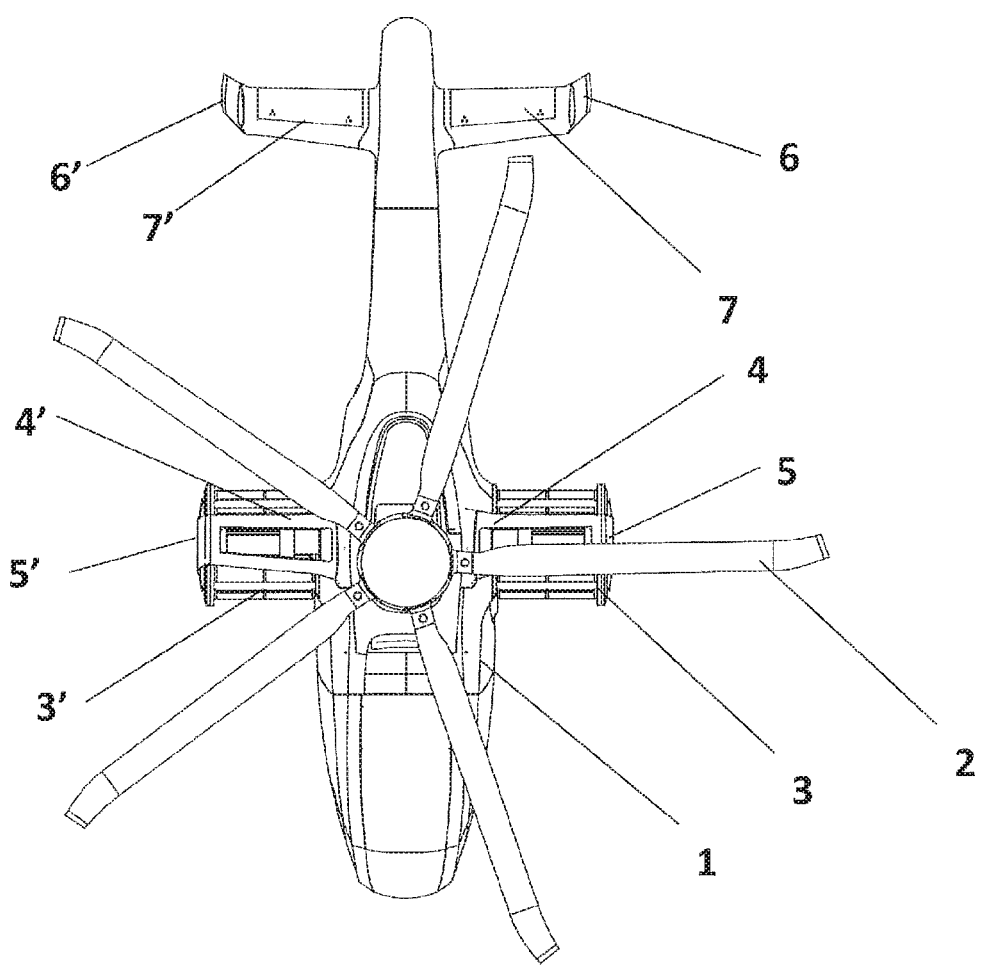
FIG. 4 shows the helicopter of FIG. 1 in a plan view.

From FIG. 4 there becomes evident in particular the horizontal and vertical stabilizer 6, 6', 7, 7'.

Figure 5:
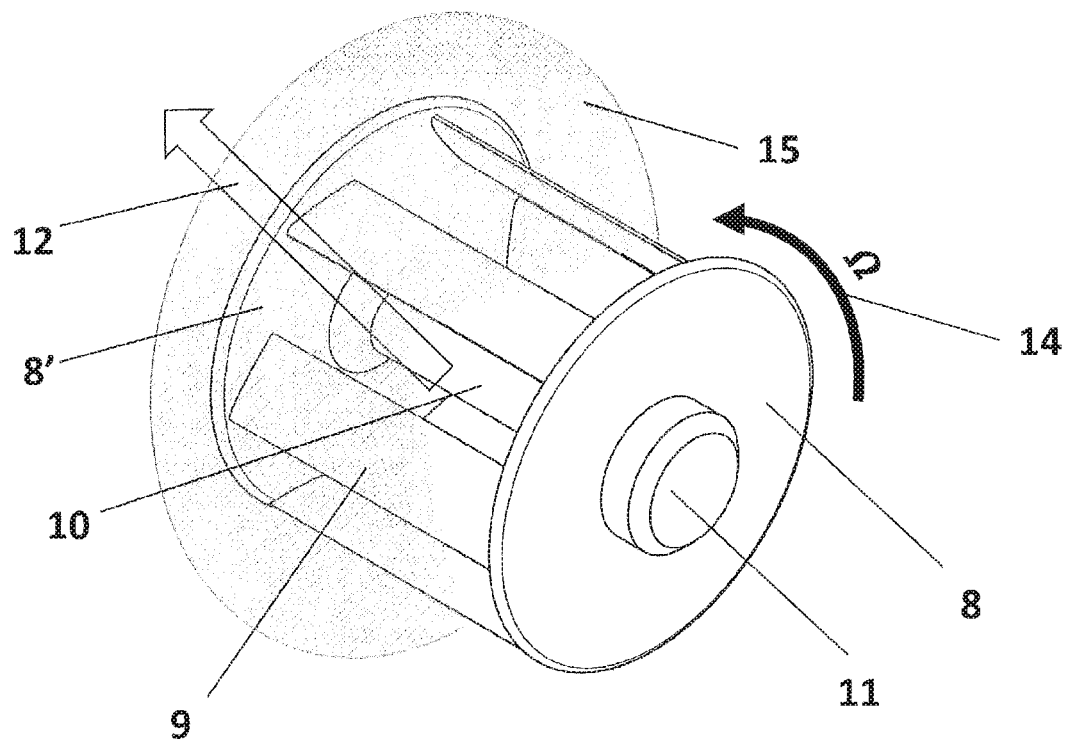
FIG. 5 shows a cyclogyro rotor in a diagonal view.

FIG. 5 shows the right-hand side cyclogyro rotor 3 of FIG. 2 in a diagonal view, consisting substantially of the rotor shaft 10, the rotor blades 9 (preferably three to six), the two rotor disks 8 and 8' with integrated rotor blade bearing or mounting, the lateral offset adjustment device 11 facing away from the helicopter aircraft fuselage, for influencing the cyclic pitch angle of the rotor blades and the direction of the thrust vector 12 which can be controlled in a plane 15 perpendicular to the axis of rotation 10 of the rotor into any direction and any size, if the cyclogyro rotor 3 is kept in rotation with a corresponding speed according to the rotational direction 14.

Figure 6:
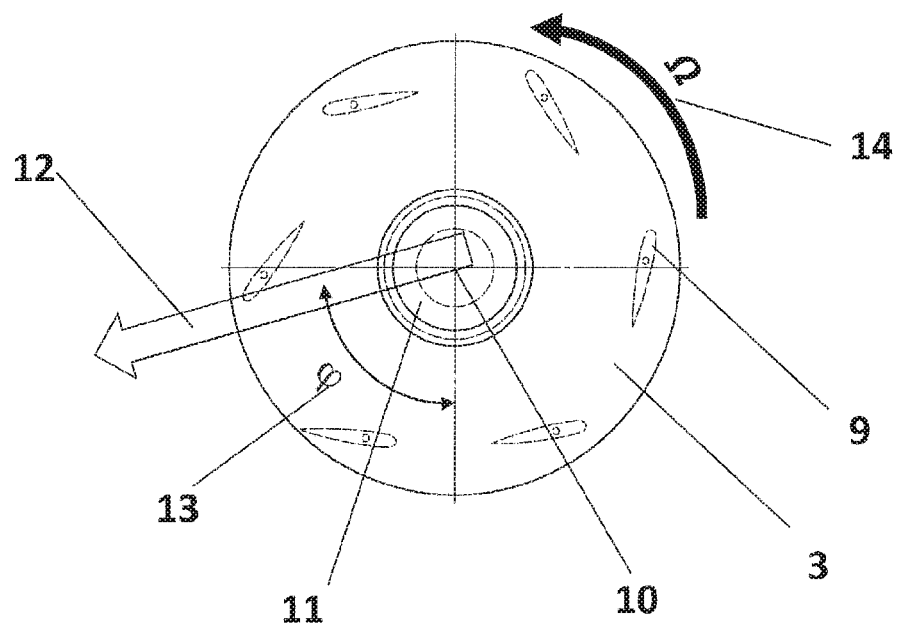
FIG. 6 shows the cyclogyro rotor in a lateral view.

FIG. 6 shows the cyclogyro rotor 3 in a lateral view, wherein by the angle φ the direction 13 of the thrust vector 12 is indicated and by Ω the direction of rotation 14 of the cyclogyro rotor is indicated.

Figure 7:
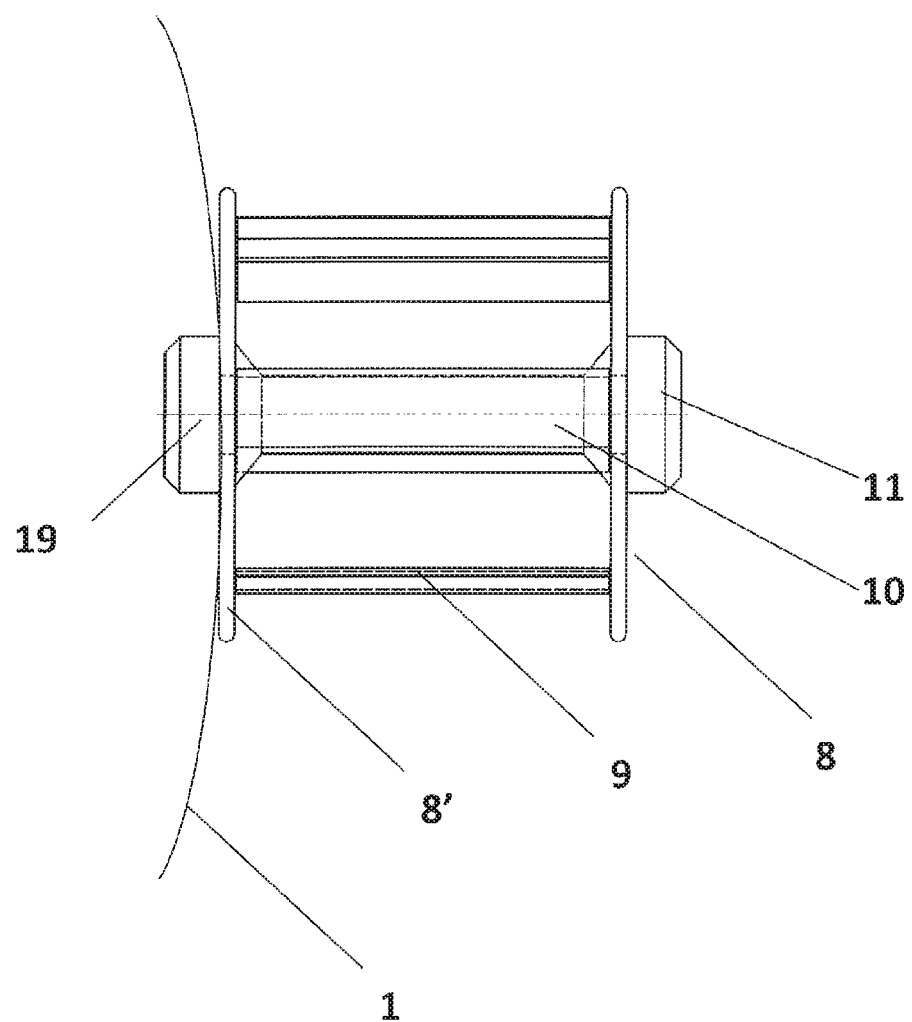
FIG. 7 shows the cyclogyro rotor in a view from the front.

FIG. 7 shows the right-hand side cyclogyro rotor 3 of FIG. 2 in a lateral view, consisting substantially of the two rotor disks 8 and 8', the rotor shaft 10, the rotor blades 9 (preferably 3 to 6), the lateral offset adjustment device 11 facing away from the aircraft fuselage 1 of the helicopter, and the offset unit 19 facing the aircraft fuselage 1 of the helicopter, for influencing the cyclic pitch angle of the rotor blades and the direction of the thrust vector.

Figure 8:
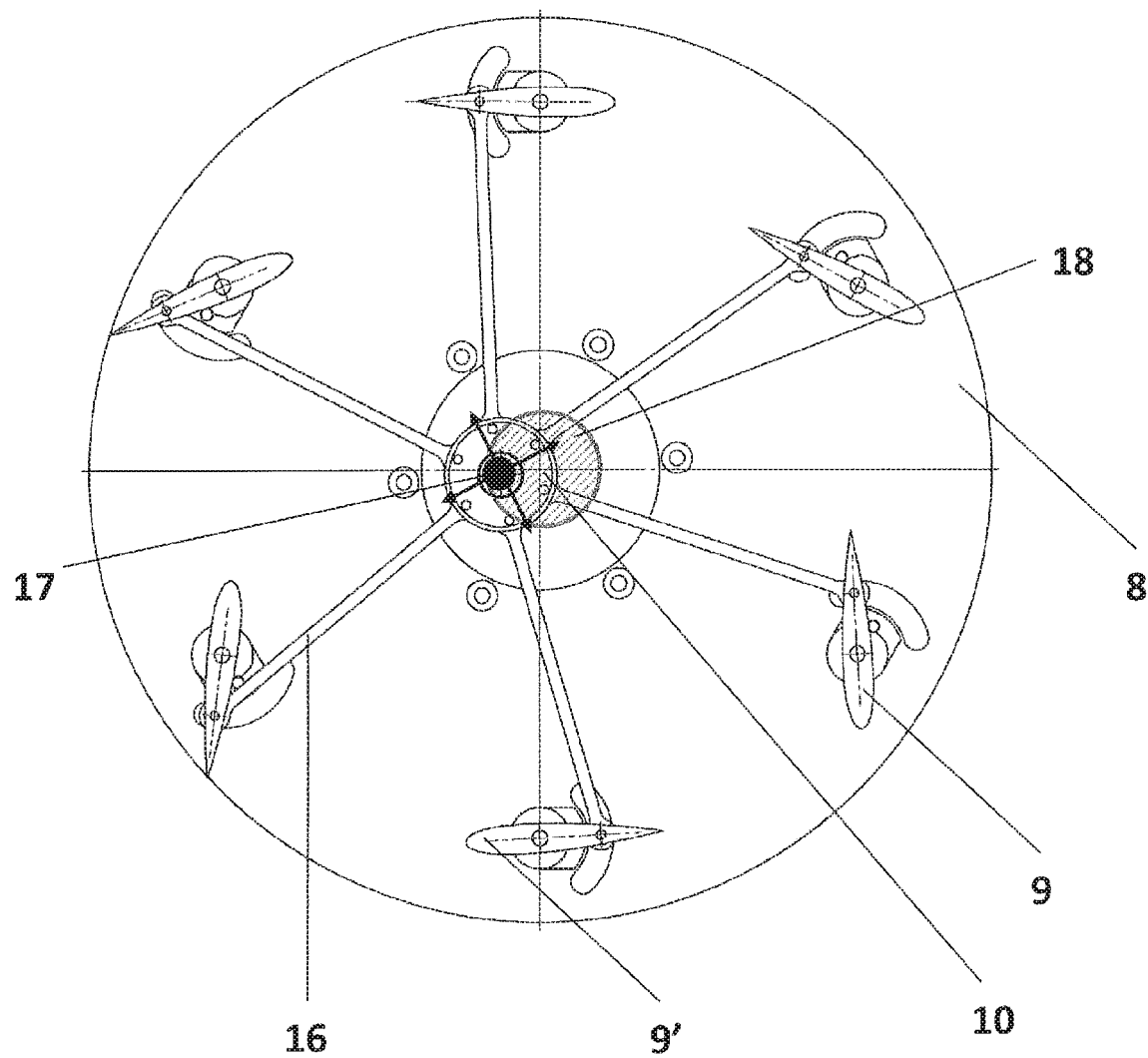
FIG. 8 shows an offset adjustment device in detail.

FIG. 8 shows the cyclic rotor blade setting devices 16 which are connected in the rotor disks 8 to the offset adjustment device 11. By displacing the central offset point 17 within a circular area 18, in accordance with the distance and the direction of the offset point 17 from the axis of rotation 10 of the rotor the size of the thrust vector and the direction of the thrust vector will be defined.

What is claimed is:

1. An aircraft comprising:
a compound helicopter with an aircraft fuselage;
a main helicopter rotor arranged on the aircraft fuselage; and
cyclogyro rotors which protrude transversely to an axis of the main helicopter rotor from the aircraft fuselage and which comprise an outer end surface
wherein
the cyclogyro rotors are connected to the aircraft fuselage by a suspension device that holds the cyclogyro rotors at an outer border of the cyclogyro rotors;
each cyclogyro rotor are configured to be controlled individually and independently; and
the cyclogyro rotors are configured to carry out a torque compensation function of the main helicopter rotor.

2. The aircraft according to claim 1, wherein the suspension device comprises wings configured to generate lift in forward flight.

3. The aircraft according to claim 1, wherein the suspension device is arranged above the cyclogyro rotors.

4. The aircraft according to claim 1, wherein the suspension device has a recess directly above the cyclogyro rotors.

5. The aircraft according to claim 1, wherein the cyclogyro rotors each have at least one offset adjustment device that is arranged in an outer border region of the cyclogyro rotors.

6. The aircraft according to claim 1, wherein the cyclogyro rotors smoothly transition into the aircraft fuselage.

7. The aircraft according to claim 1, wherein the cyclogyro rotors are connected to a drive of the main helicopter rotor by a gear.

8. The aircraft according to claim 1, wherein the cyclogyro rotors have a drive that is independent of the main helicopter rotor, wherein said drive is electrical, hydraulic, or is implemented as an individual drive unit.

9. The aircraft according to claim 1, further comprising a horizontal stabilizer and a vertical stabilizer each configured to stabilize the aircraft.

10. The aircraft according to claim 1, wherein the cyclogyro rotors are arranged below the main helicopter rotor.

11. The aircraft according to claim 1, wherein the cyclogyro rotors can are configured to be adjusted between a first position in which thrust is generated downwards and a second position in which the thrust is generated backwards.

12. The aircraft according to claim 1, wherein the cyclogyro rotors each have a length in an axial direction that substantially corresponds to a diameter of the cyclogyro rotors and wherein the length preferably lies between 80% and 120% of the diameter.

13. The aircraft according to claim 1, wherein the aircraft does not have any tail rotor.

* * * * *